(12) United States Patent
Kosov et al.

(10) Patent No.: US 8,171,450 B2
(45) Date of Patent: *May 1, 2012

(54) SYSTEM AND APPARATUS FOR GRAPHICALLY BUILDING BUSINESS RULE CONDITIONS

(75) Inventors: Yury Kosov, San Francisco, CA (US); Juliana Hing Tsang, San Lorenzo, CA (US)

(73) Assignee: International Business Machines Corporation, Armonk, NY (US)

( * ) Notice: Subject to any disclaimer, the term of this patent is extended or adjusted under 35 U.S.C. 154(b) by 819 days.

This patent is subject to a terminal disclaimer.

(21) Appl. No.: 12/326,324

(22) Filed: Dec. 2, 2008

(65) Prior Publication Data

US 2009/0113384 A1    Apr. 30, 2009

Related U.S. Application Data

(63) Continuation of application No. 11/277,278, filed on Mar. 23, 2006, now Pat. No. 7,562,340.

(51) Int. Cl.
*G06F 9/44* (2006.01)
(52) U.S. Cl. .......... 717/105; 717/104; 717/109
(58) Field of Classification Search .......... None
See application file for complete search history.

(56) References Cited

U.S. PATENT DOCUMENTS

| | | | |
|---|---|---|---|
| 4,901,221 A | 2/1990 | Kodosky et al. | |
| 4,914,568 A | 4/1990 | Kodosky et al. | |
| 5,291,587 A | 3/1994 | Kodosky et al. | |
| 5,301,336 A | 4/1994 | Kodosky et al. | |
| 5,485,618 A | 1/1996 | Smith | |
| 6,671,691 B1 | 12/2003 | Bigus | |
| 6,883,144 B2 | 4/2005 | Zielinski et al. | |
| 7,020,869 B2 | 3/2006 | Abrari et al. | |
| 7,610,575 B2 * | 10/2009 | Sproule | 717/103 |
| 2003/0046665 A1 | 3/2003 | Ilin | |
| 2004/0034848 A1 | 2/2004 | Moore et al. | |
| 2004/0187090 A1 | 9/2004 | Meacham | |
| 2004/0210445 A1 * | 10/2004 | Veronese et al. | 705/1 |
| 2007/0067756 A1 | 3/2007 | Garza | |
| 2007/0157165 A1 | 7/2007 | Kim | |
| 2007/0198968 A1 | 8/2007 | Shenfield et al. | |

* cited by examiner

*Primary Examiner* — Lewis A Bullock, Jr.
*Assistant Examiner* — Mark Gooray
(74) *Attorney, Agent, or Firm* — Kunzler Needham Massey & Thorpe

(57) ABSTRACT

A system and apparatus are disclosed for graphically building business rule conditions. The apparatus of graphically building business rule conditions comprises an expression icon module that displays a menu of function icons for the user, and a business attribute module that displays a menu of business rule attribute icons for the user. A user interface module allows the user to freely drag and drop functions and attributes onto a staging canvas, and relate the functions and attributes to build a graphical depiction of the desired business rule condition. A source code module generates source code directly from the graphical depiction such that the user does not have to understand the specific syntax and nuances of the development environment or runtime environment for the business rule.

20 Claims, 10 Drawing Sheets

602

| Business attribute | |
|---|---|
| Field | Field value |
| 604 Business event identifier | BUS_ID |
| 606 Business event subject identifier | Boxes Shipped |
| 608 Business event subject property value | PKG_SHPD |

610

| Business attribute | |
|---|---|
| Field | Field value |
| 612 Business event identifier | BUS_ID |
| 614 Business event subject identifier | Customer number |
| 616 Business event subject property value | CSTM_NO |

618

| Business attribute | |
|---|---|
| Field | Field value |
| 620 Business event identifier | BUS_ID |
| 622 Business event subject identifier | Shipping destination |
| 624 Business event subject property value | ADDR_LN1 |
| 625 | ADDR_LN2 |

626

| Business attribute | |
|---|---|
| Field | Field value |
| 628 Business event identifier | ID_field |
| 630 Business event subject identifier | Balance due |
| 632 Business event subject property value | Balance_dllrs |

Fig. 6

SYSTEM AND APPARATUS FOR GRAPHICALLY BUILDING BUSINESS RULE CONDITIONS

CROSS-REFERENCES TO RELATED APPLICATIONS

This application is a continuation of and claims priority to U.S. patent application Ser. No. 11/277,278, now U.S. Pat. No. 7,562,340 entitled "METHOD FOR GRAPHICALLY BUILDING BUSINESS RULE CONDITIONS" and filed on Mar. 23, 2006 for Yury Kosov et al., which is incorporated herein by reference.

BACKGROUND OF THE INVENTION

1. Field of the Invention

This invention relates to building business rule conditions through a graphical user interface.

2. Description of the Related Art

Businesses often use integrated business solutions to perform and track business transactions. The data elements used for these transactions are typically called business objects. Business objects contain attributes, and the system may create a business object probe from the business object, where the probe contains a subset of the attributes of the business object. The business object probe may be passed to a business rule to see whether the business object probe satisfies the conditions of the business rule. If the business object probe does satisfy the conditions of the business rule, some system action may be taken accordingly. For example, a business object probe may comprise the dollar amount of a customer order, and the business rule may allow free shipping for the customer if the dollar amount is over $100.

In the current art, business rule conditions must be created by someone with significant experience in programming for the operating system or development environment that builds the business rule condition. Some systems require the person entering the condition expression to manually type the entire source code directly into a program. Some systems have a semi-automatic method of entering condition expression by allowing a user to make certain text selections from menus or in a wizard to allow the user to automatically paste some elements of the code into a line of text that will later be entered into a program.

The current art suffers from several disadvantages. The user in the current art must build the condition into a line of text, and must therefore mentally visualize the logic of conditions within the business rule independently in relation to the line of text. In addition, the user must mentally trace the order of operation of elements entered to ensure that all elements of the business rule are properly represented and executed during runtime. Further, the user must understand the syntax of expression operators, order of operation indicators, and operands within the target source code of the business rule including special versions of the target source code related to the specific development environment, because the user ultimately manually finalizes the business object probe and places it into the intended program.

Finally, the current art is unavailable to someone without significant programming skill in the target source code language and development environment. The nature of condition expression makes it likely that someone unskilled in programming will be developing the basic business rule conditions. For example, a marketing person might want to give free shipping on certain orders from customers, or a purchasing manager may wish to flag certain types of check payments for special verification. In these instances, they need to translate the business need to the final programmer who then implements it. This process takes time and introduces the possibility of miscommunication and error.

From the foregoing discussion, it should be apparent that a need exists for a system and apparatus that allows a user to enter business rule conditions graphically and automatically. Beneficially, such a system and apparatus would allow even a non-technical user to visualize the condition and draft the condition, allow the user to enter condition elements in any order, revise the condition elements, and tailor the syntax for the target source code language and development environment without additional input or double-checking by the user.

SUMMARY OF THE INVENTION

The present invention has been developed in response to the present state of the art, and in particular, in response to the problems and needs in the art that have not yet been fully solved by currently available condition development tools. Accordingly, the present invention has been developed to provide a system and apparatus for graphically building business rule conditions that overcome many or all of the above-discussed shortcomings in the art.

A system of the present invention is presented to graphically build business rule conditions. The system may comprise a build-time portion and a run-time portion. The build-time portion of the system may be embodied in a development environment operated by a user. The run-time portion of the system may be embodied in an integration server, a network, an enterprise information system, and a business object processing module at run-time.

The development environment may comprise a business object processing module, which is programmed by the development environment to be configured to process business objects. The development environment may further comprise a business rule creation tool configured to build a graphical representation of a business rule condition thereof, and to generate a usable source code implementation of the business rule condition for the business rule processing module directly from the graphical representation.

The business rule condition creation tool may comprise an expression icon module configured to list available graphical expression function icons for the user. The expression function icons available may be configured to depend upon compatibility with the development environment and the rights of the user of the tool. The expression function icons may be configured such that the expression function represented is understandable to a person without programming skill by the appearance of the expression function icon. An advanced user may modify a set of base expression function icons, and build new expression function icons that can be used within the graphical framework of the invention. The business rule condition creation tool may further comprise an expression icon module configured to list available functional expression icons, and a business attribute module configured to list available business attribute icons for the user. Business attribute icons represent the attribute values for a business object.

The business rule condition creation tool may further comprise a user interface module. The user interface module may accept user input to combine expression function icons and business attribute icons to build a graphical depiction of a business rule condition for a desired business rule. The user interface module may provide tools to add, copy, and relate expression function icons and business attribute icons quickly.

The tool may have an expression definition module. The expression definition module may translate the graphical depiction of the desired business rule condition into a generic logic expression. The generic logic expression can then be converted to an expression in a desired source code language.

A method of the invention is also presented for graphically building business rule conditions. The method may begin with retrieving an expression function definition file. The expression function definition file retrieved may vary depending upon the applicable rights of the user and compatibility with the development environment. The method may continue with retrieving a set or a user-defined subset of business attributes for one or more business object probes. The set of business attributes may be based on the type of event the business object probe is being designed to evaluate.

The method may continue with displaying a graphical depiction of the desired business rule condition based upon drag-and-drop input from a user. The method may validate the graphical depiction before translating the graphical depiction to a generic logic expression. The method may proceed with converting the generic logic expression to usable source code of a target language. The source code target language may be selectable by the user.

The method may allow the user to quickly review and debug a business rule condition. The user may load a previously built business rule condition, and view a business rule condition pictorially to see the relationships within the probe in an intuitive manner.

A method is also disclosed for drafting a business rule condition and making the source code available to another quickly. The method may begin with determining the requirements of an intended recipient. The method may continue with retrieving an expression definition file based on the rights of the intended recipient. The method may proceed with entering the intended recipient requirements into a business rule condition creation tool having a graphical condition builder. Finally, the method may conclude with making the source code available to the intended recipient.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 6 is an illustration of several embodiments of business attributes in accordance with the present invention;

DETAILED DESCRIPTION OF THE INVENTION

Figure 1:
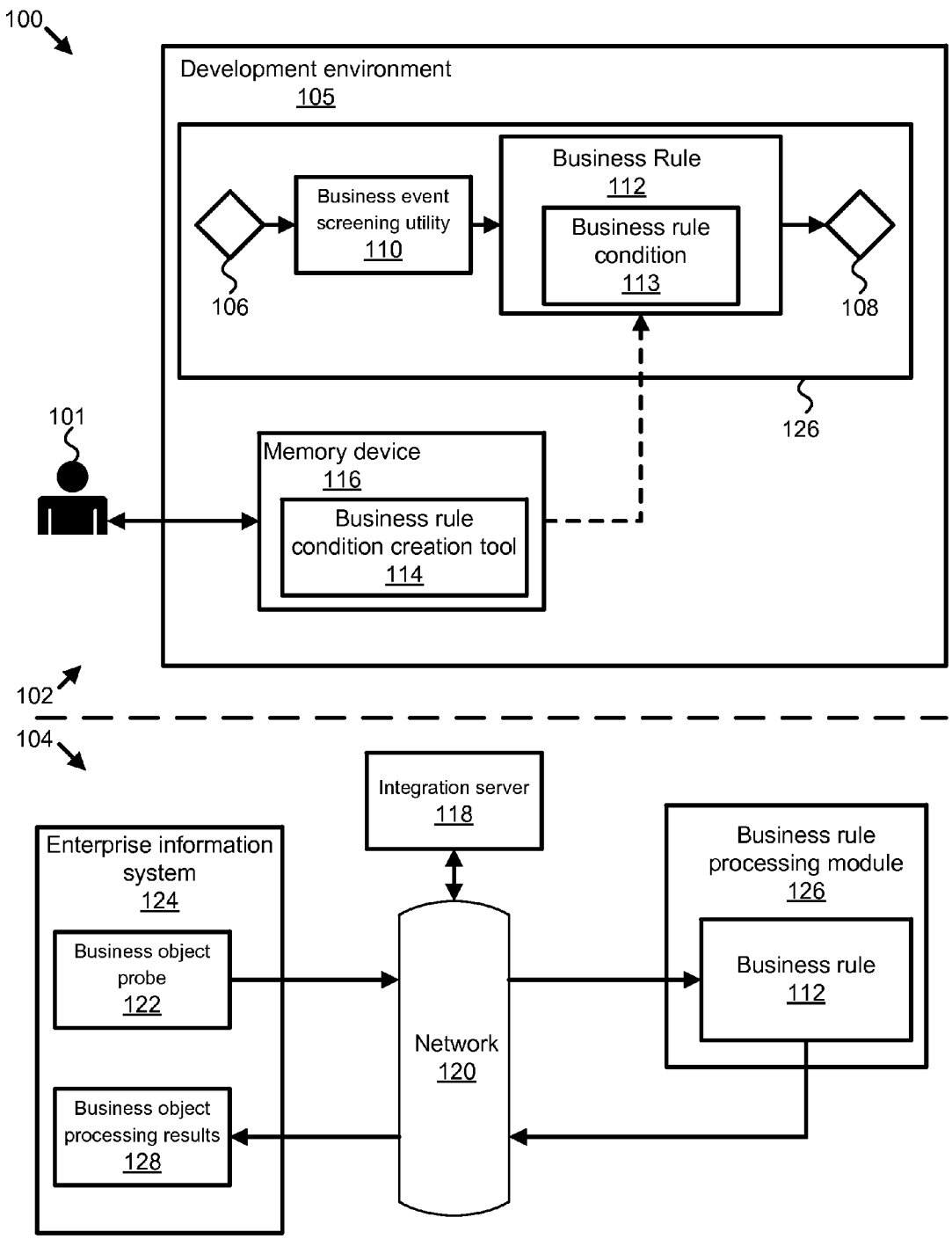
FIG. 1 is a schematic block diagram illustrating one embodiment of a system for graphically building business rule conditions in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 depicts one embodiment of a system 100 for graphically building business rule conditions in accordance with the present invention. Business rule conditions are criteria used to determine whether a business object probe meets certain conditions defined by a user. A business rule condition may be configured to operate within a business rule. A business rule is software code designed to investigate a business object probe and determine if the business object probe should be targeted for further analysis or operation. Business rule conditions may be used to implement business rules or business processes on business object probes on a client, on a server, or on middleware. For example, a user may build a business rule condition that will be set to TRUE whenever a customer orders "at least five books." In the example, when a business object of type "customer order" comes into the system, a business object probe is created with the number of books ordered by the customer. The business object probe is compared with the business rule condition of business rules to determine whether the business object probe meets the criteria of "at least five books."

The system 100 may comprise a build-time section 102 and a run-time section 104. The build-time section 102 may be a development environment 105 configured to generate software code that is used in the run-time section 104. The software code may comprise a business rule processing module 126. Build-time refers to the time in which the user is creating software that will operate during a future run-time. Run-time refers to that time during which the built software is operating and ready to process business object probes 122. While the user 101 builds new software for the business rule processing module 126, it is possible that a previous version of the business rule processing module 126 would be currently operating. Therefore, the system 100 could be utilizing the build-time section 102 and the run-time section 104 simultaneously.

The build-time section 102 may comprise a user 101 that interacts with a development environment 105. The development environment 105 may comprise an integrated development environment such as Eclipse™, NetBeans™, Visual Studio™, and the like. The development environment 105 may comprise a business rule condition creation tool 114 stored on and executed from a memory device 116. The business rule condition creation tool 114 may be a standalone plug-in to the development environment 105. For example, the business rule condition creation tool 114 could be Java code that adds to the capability of the base development environment 105. The business rule condition 113 created by the business rule condition creation tool 114 may be connected to the business rule processing module 126. In one embodiment, the business rule processing module 126 is configured to execute the business rule 112 on a business object probe 122 received over a network 120.

The business rule processing module 126 may further comprise a business event input connection 106, a result output connection 108, a business event screening utility 110, and the business rule 112. The business event input connection 106 may be configured to communicate with a network 120 to receive a business object probe 122 from an enterprise information system 124. The business event screening utility 110 may be configured to conditionally execute the business rule 112. For example, the business event screening utility 110 may be configured to execute the business rule 112 only when the business event input connection 106 receives a business object probe 122 with the information "number of books" over the network 120.

The business rule 112 may comprise a business rule condition 113 configured to flag a business object probe 122 as meeting predefined conditions. The user 101 may set these predefined conditions using the business rule condition creation tool 114. The result output connection 108 may be configured to communicate with a network 120 to allow the enterprise information system 124 to receive the business rule processing results 128, which may include the output of the business rule processing module 126.

The network 120 may be coupled to an integration server 118. The integration server 118 may be configured to receive a business object probe 122 from the enterprise information system 124 over the network 120, and to send the business object probe 122 to the business rule processing module 126. The business rule processing module 126 may execute the business rule 112 on the business object probe 122.

Figure 2:
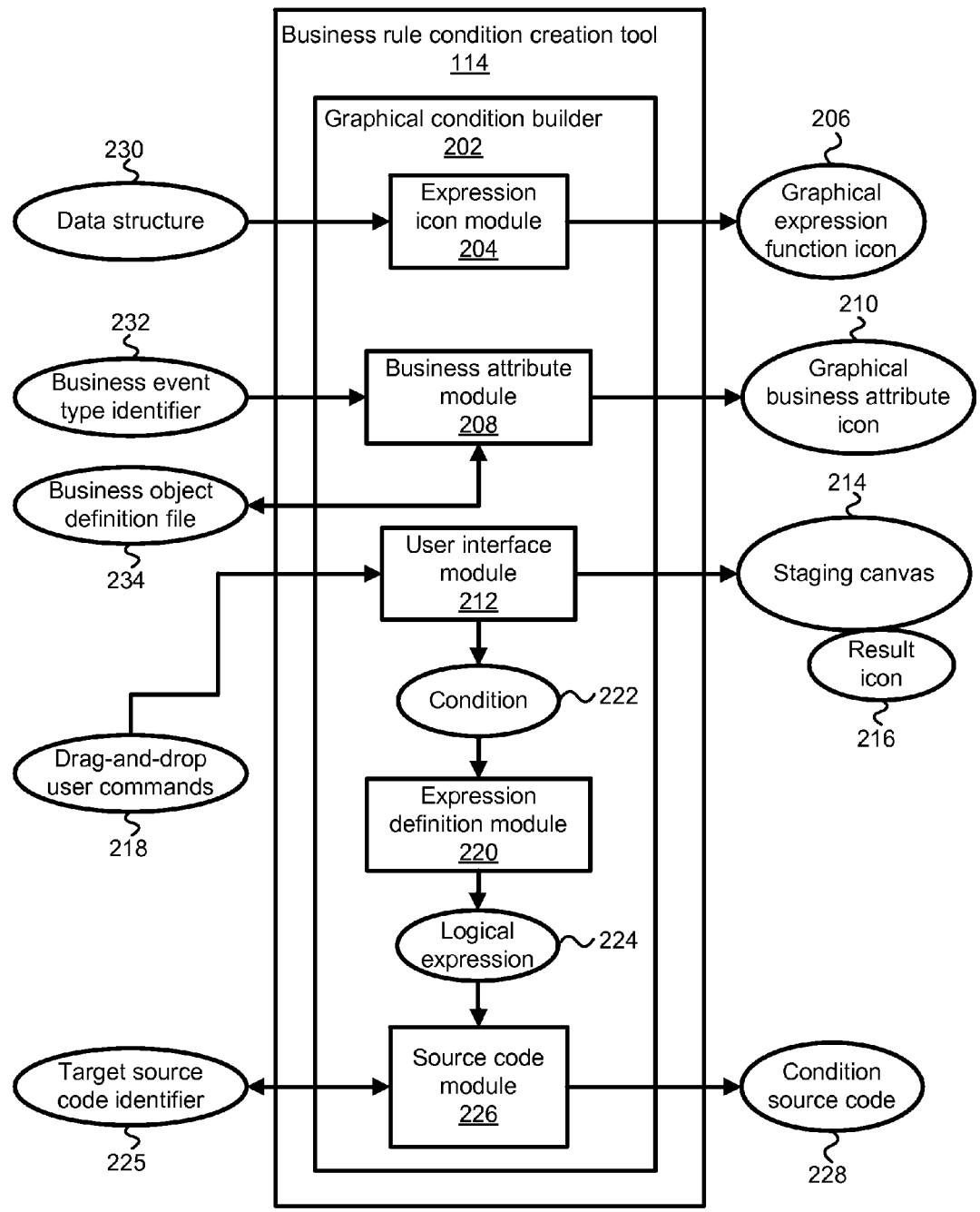
FIG. 2 is a schematic block diagram illustrating one embodiment of a business rule condition creation tool in accordance with the present invention.

FIG. 2 depicts one embodiment of a business rule condition creation tool 114 in accordance with the present invention. The business rule condition creation tool 114 may comprise a graphical condition builder 202. The graphical condition builder 202 may comprise an expression icon module 204 configured to display a graphical expression function icon 206 to the user 101. The graphical expression function icon 206 may be based on a data structure 230 which the expression icon module 204 may receive from the development environment 105.

The graphical expression function icon 206 may comprise a graphic icon which can be selected by the user 101 and transferred to a staging canvas 214. The graphical expression function icon 206 represents an operator or function that may be used within a business rule condition. The graphical expression function icon 206 may be selectable by the user 101 from a menu that may include multiple expression function icons 206. The graphical expression function icon 206 may be selectable within a graphical hierarchical interface structure, a list, or the like. The graphical condition builder 202 may allow drag-and-drop, cut, copy, paste, and other user interface commands from the user 101 to transfer the graphical expression function icon 206 to the staging canvas 214 and to manipulate the graphical expression function icon 206 on the staging canvas 214.

The graphical condition builder 202 may further comprise a business attribute module 208 configured to receive a business event type identifier 232, to interact with a business object definition file 234, and to display a graphical business attribute icon 210 to the user 101. The business event type identifier 232 may be received from the business event screening utility 110 or from the network 120. The business event type identifier 232 can be any description identifying a business event type; for example, the business event type identifier 232 might be "customer order," "paycheck stub notification," or "A-01."

The business attribute module 208 may be configured to interact with a business object definition file 234 by retrieving a set of business attributes from the business object definition file 234 based on the business event type identifier 232. For example, the business attribute module 208 may receive a business event type identifier 232 of "customer package order," and the business attribute module 208 may check "customer package order" in a business object definition file 234 and retrieve image information describing graphical icons and associated data fields "Packages shipped," "Customer number," and "Shipping destination."

The graphical business attribute icon 210 is an icon that may be based on the retrieved set of business attributes. The graphical business attribute icon 210 graphically represents attributes of a business object that a user can use in defining a business rule condition. The graphical business attribute icon 210 may be selectable by the user 101 from a menu or other user interface component such as a hierarchical structure, and the graphical condition builder 202 may allow drag-and-drop, cut, copy, paste, and other user interface commands from the user 101 to manipulate the graphical business attribute icon 210.

The graphical condition builder 202 may further comprise a user interface module 212 configured to display a staging canvas 214 to the user 101. The staging canvas 214 may have a result icon 126. The result icon 126 may represent a BOOLEAN result value for the business rule condition. The graphical condition builder 202 may also display a set of graphical expression function icon 206 and graphical business attribute icons 210.

In one embodiment, the staging canvas 214 is configured to receive one or more graphical expression function icons 206 and one or more graphical business attribute icons 210. The staging canvas 214 may be called the "drawing area," and it may be configured to allow placement of the graphical icons 206, 210, one or more result icons 216, and graphical elements that relate all of the icons 206, 210, 216. In one embodiment, the graphical elements that relate all of the icons 206, 210, 216 comprise directional arrows that can be dragged to input ports and output ports of the icons 206, 210, 216 to indicate the operational flow of a condition 222.

The user 101 may interact with the user interface module 212 with drag-and-drop user commands 218, keyboard shortcuts, and the like. The user interface module 212 may position the graphical expression function icon 206 and the graphical business attribute icon 210 on the staging canvas 214 according to the user 101 interactions. The user interface module 212 may also relate the icons 206, 210, 216 according to the user 101 interactions. The positioned and related icons 206, 210, 216 may define a graphical representation of a condition 222.

In one embodiment, a graphical expression function icon 206 may operate without being related to any graphical business attribute icon 210 or the result icon 216. For example, a graphical expression function icon 206 may represent an operation to put an entry into a log file each time the business rule condition 113 executes. A graphical expression function icon 206 may thus provide a useful function for the business rule condition 113 without the user 101 relating the icon 206 to any other icon 206, 210, 216.

The graphical condition builder 202 may further comprise an expression definition module 220. The expression definition module 220 may be configured to translate the graphical representation of a condition 222 into a logical expression 224. In one embodiment, the logical expression 224 is expressed using a defined grammar. Alternatively, the logical expression 224 is expressed in a preselected programming language, for example "C." The logical expression 224 may comprise a generic programming language or other encoding of logic.

The graphical condition builder 202 may further comprise a source code module 226 configured to convert the logical expression 224 to a condition expressed in source code 228. The source code module 226 may be configured determine a target source code identifier 225 which identifies a target source code language and to convert the logical expression 224 to a condition in the source code 228 having a syntax compatible with the target source code language. The target source code language can be any language used for programming computers, including at least dBASE, SQL, Java, LISP, PERL, PASCAL, FORTRAN, BASIC, VISUAL BASIC, ASSEMBLY, an application-specific source code language, a device-specific source code language, and variations of the "C" language.

An application-specific language might be a special version of a programming language created for a certain software application, a proprietary programming language, or any other non-standard language. Examples may include, but are not limited to, the "M-file" programming language in Matlab by Mathworks, or Visual Basic for Applications by Microsoft. A device-specific source code language may be business rule application creation software like Amit (Active Middleware Technology), Versata Studio & Logic Server, Blaze Advisor, and the like.

Figure 3:
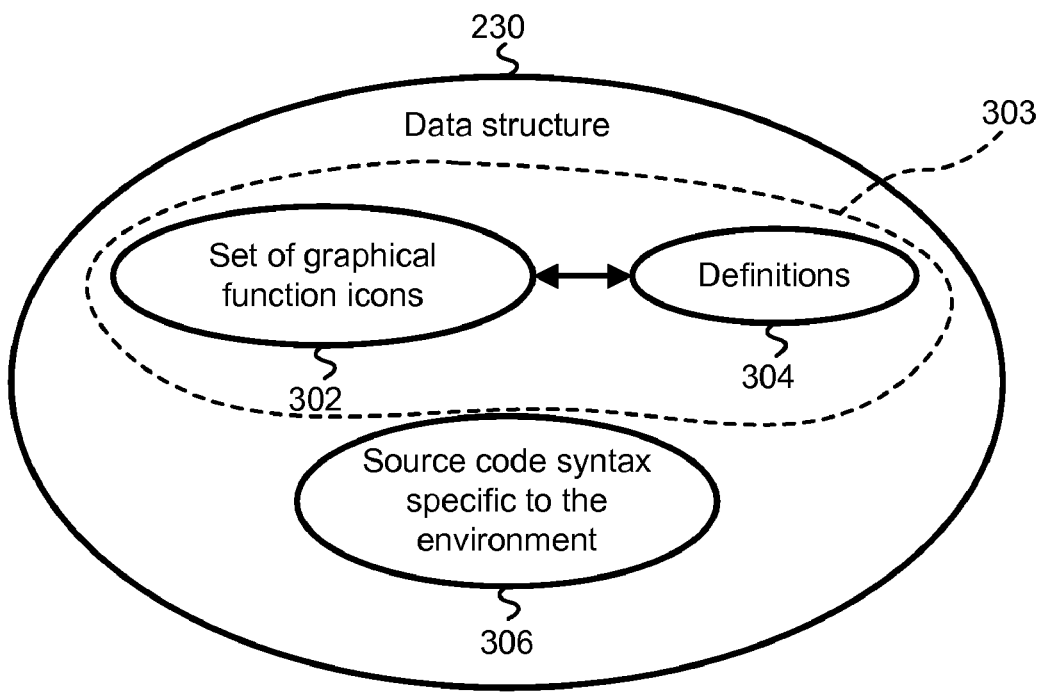
FIG. 3 is a schematic block diagram illustrating one embodiment of a data structure from a development environment in accordance with the present invention.

FIG. 3 depicts one embodiment of a schematic block diagram of a data structure 230 in accordance with the present invention. The data structure 230 may be imported from the development environment 105 to the expression icon module 204. The data structure 230 may comprise a set of graphical function icons 302, which may be a set of graphical function icons 302 supported within the development environment 105.

The data structure 230 may further comprise definitions 304 for the set of graphical function icons 302. The definitions 304 may comprise, for each of the set of graphical function icons 302: numbers of input and output ports, types of data expected at the input and output ports, and a logical description of the operations performed by the icon.

For example, the definition 304 for a graphical function icon of "AND" may comprise two input ports described as "A" and "B", one output port described as "C", BOOLEAN data expected at the input and output ports, and an logical description of "If A and B." In a further example, the definition 304 for a graphical function icon of "Log execution" may comprise zero input ports and zero output ports, and a logical description of "Log the execution of the business rule condition." The definitions 304 may be encoded in an XML file, or they may be stored in any parseable format such as a spreadsheet, a comma delimited file, and the like. In one embodiment, the data structure elements 302 and 304 may be combined into an expression function definition file 303.

The data structure 230 may further comprise source code syntax 306 specific to the development environment 105. For example, the business rule condition creation tool 114 may be a plug-in configured to operate within Borland® C++ or Microsoft® C++, and the source code syntax 306 data may contain the information required to build the condition source code 228 within either C++ environment. In the example, the expression icon module 204 would use information on the development environment 105 to import the environment-specific source code syntax 306 from the data structure 230.

Figure 4:
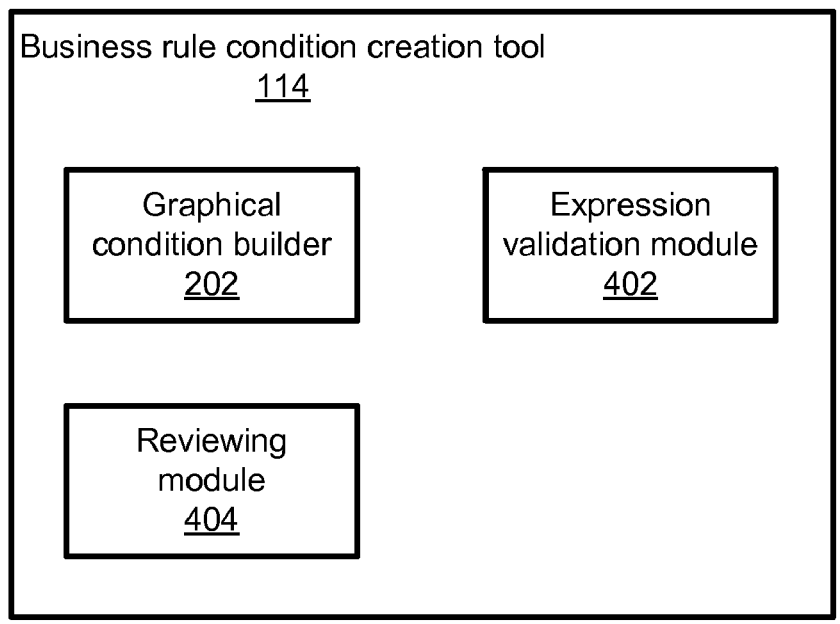
FIG. 4 is a schematic block diagram illustrating one embodiment of a business rule condition creation tool in accordance with the present invention.

FIG. 4 depicts one embodiment of a schematic block diagram of a business rule condition creation tool 114. The business rule condition creation tool 114 may comprise a graphical condition builder 202, an expression validation module 402, and a reviewing module 404.

The expression validation module 402 may be configured to validate the graphical representation of a condition 222. The expression validation module 402 may be configured to check the condition icons 206, 210, 216 for disconnected input or output ports, invalid input data types, semantic errors, or other types of errors. The expression validation module 402 may be configured to operate automatically before the expression definition module 220 converts the condition 222 into a logical expression 224, or before the source code module 226 converts the logical expression 224 into a condition comprising source code 228. The expression validation module 402 may be configured, in one embodiment, to operate in response to a request from the user 101. The expression validation module 402 may be configured to prompt the user 101 to fix a detected error.

The reviewing module 404 may be configured to allow the user to pictorially review the graphical representation of a condition 222 and make graphical modifications. The reviewing module 404 may be configured to load a saved graphical representation of a condition 222 previously stored. The reviewing module 404 may be configured to activate debugging features, such as allowing the graphical representation of a condition 222 to execute in a simulated environment, viewing intermediate results of the operation of the graphical representation of a condition 222 at points before the result icon 216, allowing step-by-step execution of the business rule condition, and other debugging features well known in the programming art.

Figure 5A:
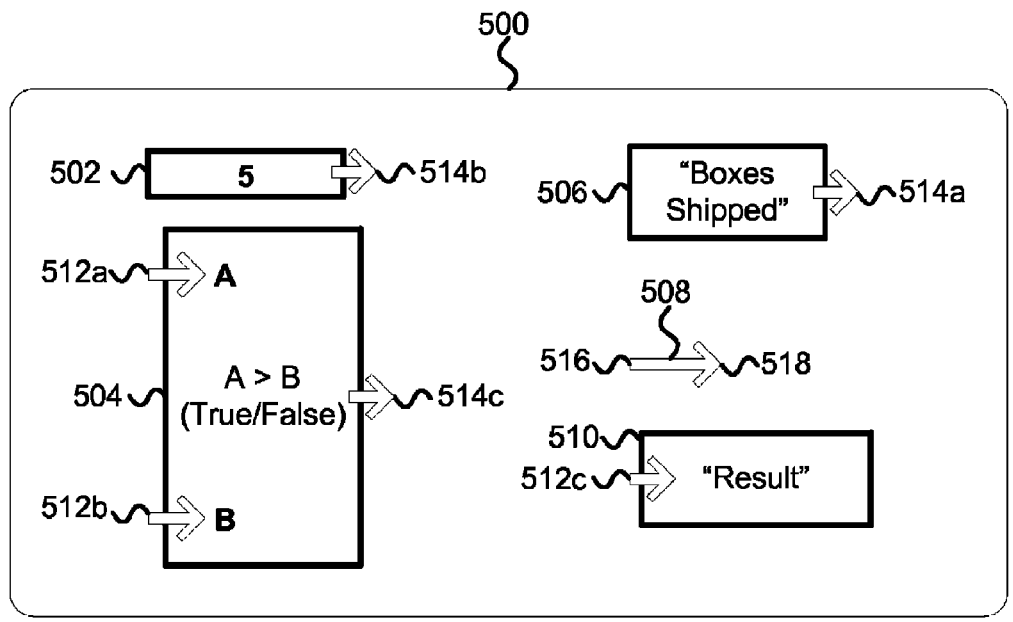
FIG. 5a is a schematic block diagram illustrating one embodiment of a graphical expression function icon, a graphical business object attribute icon, and a relationship between the graphical expression function icon and the graphical business object attribute icon, in accordance with the present invention.

FIG. 5a illustrates one embodiment of a staging canvas 500 having a result icon 510 in accordance with the present invention. As shown in FIG. 5a, the user interface module 212 has already positioned a graphical expression function icon 504 and a graphical business attribute icon 506 onto the staging canvas 500. The user interface module 212 has also positioned a constant input icon 502 and a relational icon 508 on the staging canvas 500. The relational icon 508 may comprise an output designator 516 and an input designator 518. In one embodiment, the user interface module 212 positions these icons 502, 504, 506, 508, 510 in response to drag-and-drop commands 218 from the user 101.

The relational icon 508 may comprise a directional arrow. The graphical expression function icon 504 may include at least one input connector 512 and at least one output connector 514. The graphical expression function icon 504 in FIG. 5a is shown with two input connectors 512a, 512b and one output connector 514c. The graphical business attribute icon 506 may include at least one output connector 514. The graphical business attribute icon 506 in FIG. 5a is shown with one output connector 514a. The constant input icon 502 in FIG. 5a is shown with one output connector 514b.

The staging canvas 500 may be configured to be a part of a screen provided by the user interface module 212. The user interface module 212 may also provide menus with operating system (not shown) commands, menus of relevant utilities to the development environment 105, menus of available graphical expression function icons 206, and menus of available graphical business attribute icons 210. These and other potential display features of the user interface module 212 are known to those of skill in the art, and are not shown in FIGS. 5a and 5b to focus and clarify the illustrated features of the embodiment of the invention.

Figure 5B:
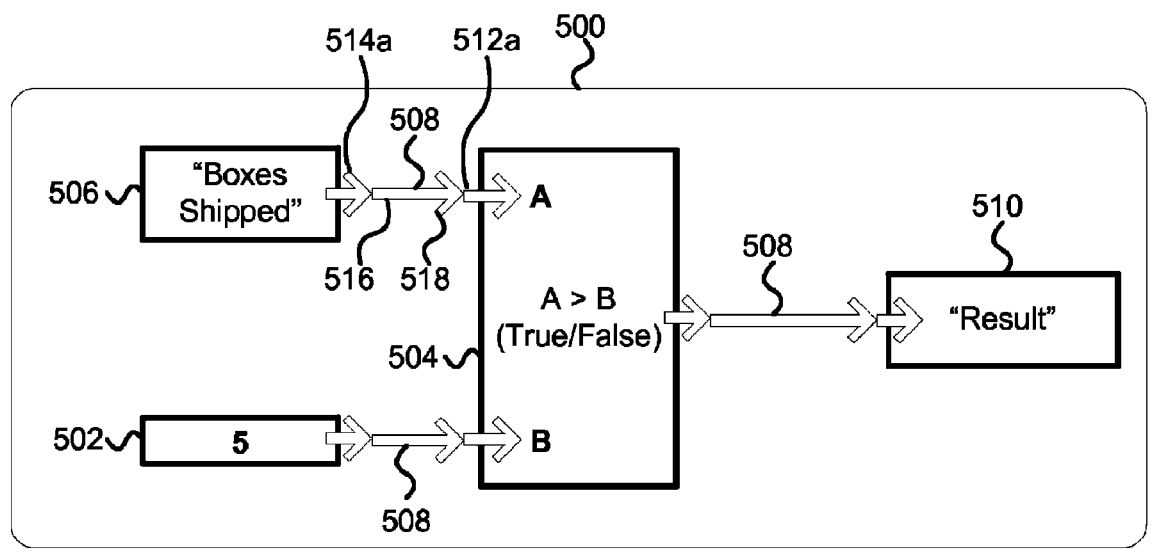
FIG. 5b is a schematic block diagram illustrating one embodiment of a graphical expression function icon, a graphical business object attribute icon, and a relationship between the graphical expression function icon and the graphical business object attribute icon, in accordance with the present invention.

FIG. 5b illustrates one embodiment of a staging canvas 500 having a result icon 510 in accordance with the present invention. FIG. 5b is consistent with a snapshot of the staging canvas 500 at a time subsequent to the staging canvas 500 as shown in FIG. 5a. For the embodiment of FIG. 5b, the user interface module 212 changed the relative size of the staging canvas 500 and repositioned the icons 502, 504, 506, 508, 510 in response to drag-and-drop commands 218 from the user 101. Further, the user interface module 212 has pasted copies of the relational icon 508 onto the staging canvas 500 in response to drag-and-drop commands 218 from the user 101. The user 101 could also use keyboard shortcuts to make copies of the relational icon 508, or drag new copies of a relational icon 508 onto the staging canvas 500 from a menu.

The user interface module 212 has related the output connector 514a of the graphical business attribute icon 506 to one of the input connectors 512a of the graphical expression function icon 504 in response to a drag-and-drop command 218 from the user 101 that designates the output connector icon 514a and the input connector icon 512a. The user drag-and-drop command 218 that designates the connectors may be to drag the output designator 516 of the relational icon 508 to the output connector 514a, and to drag the input designator 518 of the relational icon 508 to the input connector 512a.

Other methods of designating an output connector 514a as connected to an input connector 512a are contemplated within the scope of the invention. Without limitation, the user interface module 212 may designate an output connector 514a as connected to an input connector 512a in response to the user 101 entering a key or keys, and then clicking the input and output ports consecutively. For example, a user 101 may press a key combination, and then click on the desired connectors that should be related. Some of the input and output connectors of FIG. 5b are not labeled because such labeling is not necessary to the understanding of FIG. 5b and would clutter the features of the embodiment of the invention depicted in FIG. 5b.

Advantageously, FIG. 5b illustrates the ability of the user interface module 212 to visually communicate the flow and order of operation of the condition. This is done by way of the arrow heads for the relational icon 508, input connector 512, and output connector 514. In addition, evaluation of order and flow is communicated by the position of the icons on the canvas 500. For most users, the icons can be organized in a top-to-bottom, left-to-right fashion such that the layout of the icons matches the way the user reads text. For example, nested operations are intuitively communicated as evaluating first because they would be toward the top left corner of the canvas 500. Of course for other users, order of operation and flow may be communicated in relation to another part of the canvas 500 such as the top, right corner, or the like. In certain embodiments, the user interface module 212 may automatically organize the icons in a top-to-bottom, left-to-right manner based on how the connectors 512, 514 are related.

FIG. 6 depicts several embodiments of business attributes 602, 610, 618, 626 in accordance with the present invention. The business attributes 602, 610, 618, 626 may be stored in a business object definition file 234. The business attribute 602 may comprise a business event identifier 604, a business event subject identifier 606, and a business event subject property value 608.

In one embodiment, the business event identifier identifies the business object underlying the business object probe 122. At the system build-time 102, the business event identifier 604 is a variable—"BUS_ID"—as shown in FIG. 6. At the system run-time 104, a business object probe 122 would have a value for "BUS_ID" distinguishing the particular underlying business object for the business object probe 122 from all other business objects.

In one embodiment, the business event subject identifier 606 is hard-coded into the business object definition file 234. This is the value that identifies the purpose of a business attribute 602 to the user 101 at the system build-time 102. In one embodiment, this will be a label displayed on the graphical business attribute icon 210. In a further embodiment, the business event subject identifier 606 may be the text listed in a menu of available business attributes provided by the user interface module 212.

Referring back to FIG. 5a, the business event subject identifier 606 for the icon 506 is the value "Boxes Shipped," which indicates to the user 101 that at the system run-time 104, the output of the parameter represented by this icon 506 will be the number of boxes shipped. In a typical embodiment, the business event subject identifier 606 is used for the user 101 at the system build-time 104, and it will not be built into the condition comprising source code 228.

In one embodiment, the business event subject property value 608 comprises a variable—"PKG_SHPD", as shown in FIG. 6—that will be the system run-time 104 value of the business event subject identifier 606. For example, the business attribute 602 suggests that the parameter "PKG_SHPD" 608 will be the number of boxes shipped 606 for the business object identified by the parameter "BUS_ID" 604 in a business object probe 122 at system run-time 104.

The following interpretations of the business attributes 602, 610, 618, 626 from FIG. 6 are consistent with embodiments of the present invention, and help illustrate the usage of the business attributes 602, 610, 618, 626, but are not intended to limit the potential uses of the business attributes 602, 610, 618, 626. The drawing element 514x is used in the following descriptions to indicate generic output icons similar to 514a, 514b, and 514c as shown in FIG. 5a.

Business attribute 602 may have the term "Boxes Shipped" 606 on the related graphical business attribute icon 210, the icon 210 may have one output icon 514x that would be equal to the value of the variable "PKG_SHPD" 608 of the business object with an identifier "BUS_ID" 604 in a business object probe 122 at system run-time 104. The expression validation module 402 may be configured to test that the output icon 514x can properly send an INTEGER value, depending upon the format of the PKG_SHPD 608 variable.

Business attribute 610 may have the term "Customer number" 614 on the related graphical business attribute icon 210, the icon 210 may have one output icon 514x that would be equal to the value of the variable "CSTM_NO" 616 of the business object with an identifier "BUS_ID" 612 in a business object probe 122 at system run-time 104. The expression validation module 402 may be configured to test that the output icon 514x can properly send an INTEGER value, depending upon the format of the CSTM_NO 616 variable.

Business attribute 618 may have the term "Shipping destination" 622 on the related graphical business attribute icon 210, the icon 210 may have two output icons 514x that would be equal to the value of the variables "ADDR_LN1" 624 and "ADDR_LN2" 625 of the business object with an identifier "BUS_ID" 620 in a business object probe 122 at system run-time 104. The expression validation module 402 may be configured to test that each output icon 514x can properly send a STRING value, depending upon the format of the variables ADDR_LN1 624 and ADDR_LN2 625.

Business attribute 626 may have the term "Balance due" 630 on the related graphical business attribute icon 210, the icon 210 may have one output icon 514x that would be equal to the value of the variable "Balance_dllrs" 632 of the business object with an identifier "ID_field" 628 in a business object probe 122 at system run-time 104. The expression validation module 402 may be configured to test that the output icon 514x can properly send a CURRENCY value, depending upon the format of the Balance_dllrs 632 variable.

Figure 7:
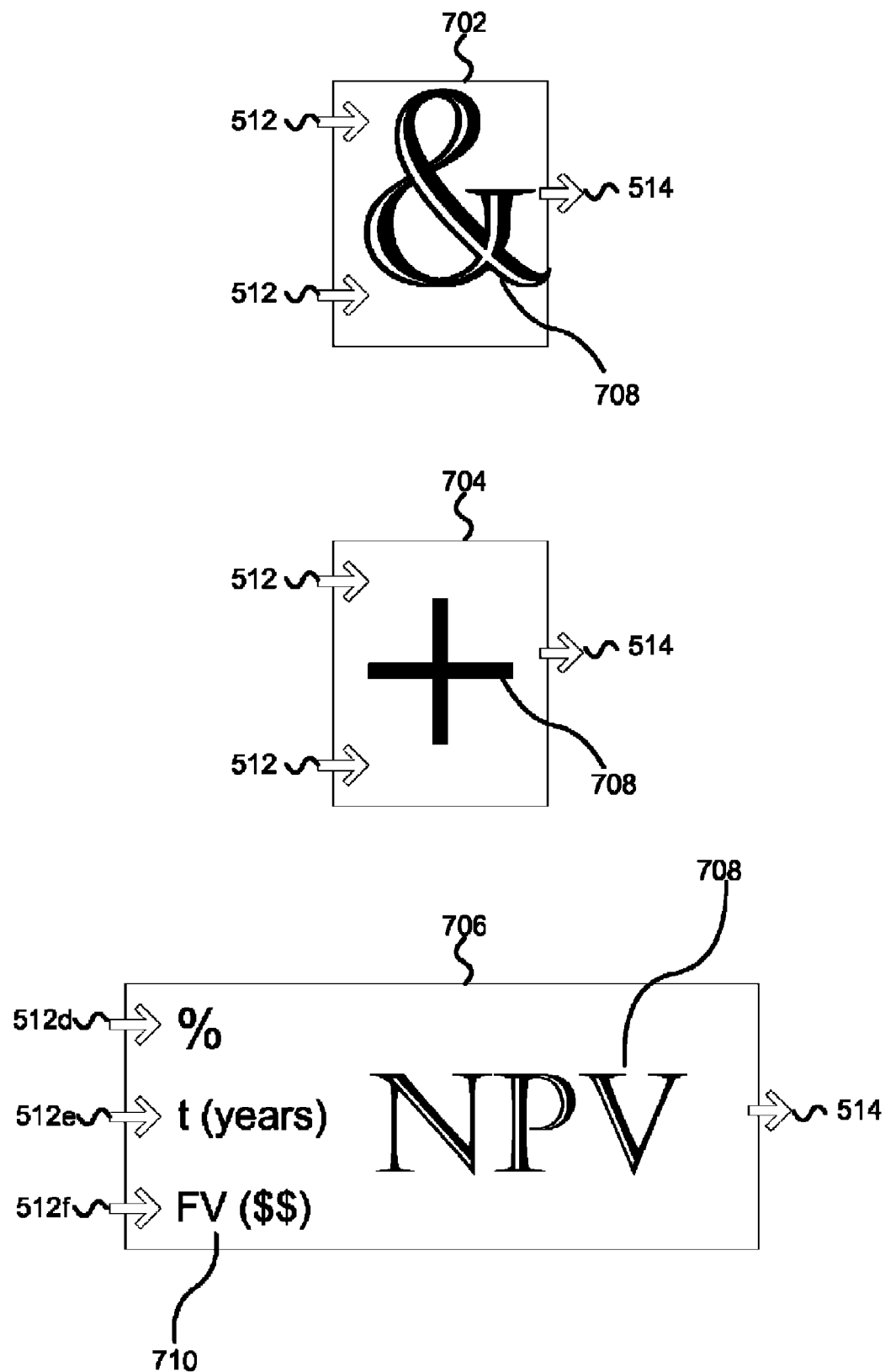
FIG. 7 illustrates several embodiments of graphical function expression icons in accordance with the present invention.

FIG. 7 depicts several embodiments of graphical expression function icons 206 in accordance with the present invention. Each of the graphical expression function icons 702, 704, 706 may comprise at least one input connector icon 512 and at least one output connector icon 514. Some embodiments of graphical expression function icons 206 may not require an input connector icon 512, an output connector icon 514, or either connector icon 512, 514.

In one embodiment, each of the graphical expression function icons 702, 704, 706 is associated with an atomic operator (not shown) within the data structure 230 which is configured to operate on at least one operand and return a result without additional configuration input from a user.

In one embodiment, each of the graphical expression function icons 702, 704, 706 comprises a description and an iconic symbol 708 configured to convey the purpose of the associated atomic operator (not shown) to a non-technical user without knowledge of business rule condition programming. The description may be shown on the icon 702, 704, 706 directly, as part of the icon in response to a user 101 action such as a mouse-over event or a right-click event, or through some combination of these description techniques. In some cases, the description may be unnecessary as the iconic symbol is sufficient to convey the purpose of the associated atomic operator to a non-technical user without knowledge of business rule condition programming.

The embodiment illustrated in the graphical expression function icon 706 shows an iconic symbol 708 and description 710 configured to convey the purpose of the associated atomic operator (not shown) to a non-technical user without knowledge of business rule condition programming. The icon 706, in one embodiment, has an associated atomic operator that calculates a net present value based on a discount rate 512d, a time in years 512e, and a future value in dollars 512f. In one embodiment, the description 710 and iconic symbol 708 shown on the icon 706 are sufficient to convey the purpose of the associated atomic operator to a target audience, where the target audience is a group of business administrators that understand the iconic symbol 708 and description 710 illustrated, but that do not have knowledge of business rule condition programming. In a further embodiment, assumptions and further information to describe the operations of the associated atomic operator are included when the user 101 right-clicks a computer mouse on the icon 706.

In one embodiment, the associated atomic operator for the icon 702 performs a logical AND operation on the parameters designated to the input icons 512. In one embodiment, the associated atomic operator for the icon 704 performs an arithmetic ADDITION operation on the parameters designated to the input icons 512.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 8:
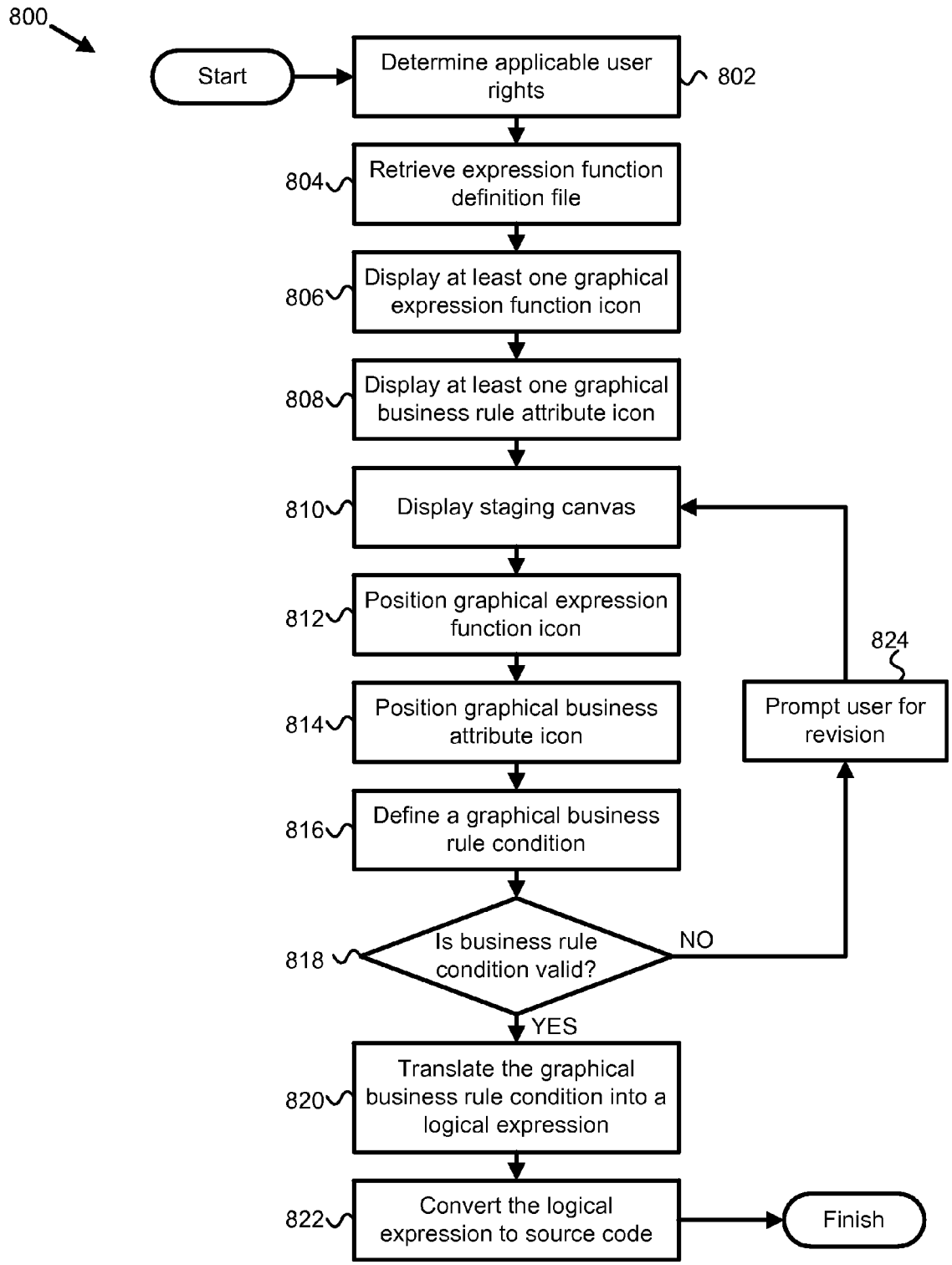
FIG. 8 is a schematic flow chart diagram illustrating one embodiment of a method for graphically building business rule conditions in accordance with the present invention.

FIG. 8 illustrates one embodiment of a method to graphically build business rule conditions in accordance with the present invention. The expression icon module 204 optionally determines 802 the applicable user 101 rights and retrieves 804 an expression function definition file 303 from the data structure 230. For example, if the user 101 bought a "Professional" version of the business rule condition creation tool 114, there may be a more extensive set of graphical function icons 302 and definitions 304 available to the user 101 than if the user 101 bought only the "Standard" version of the business rule condition creation tool 114.

In one embodiment, the expression function definition file 303 is a customizable file where the user 101 can edit the definitions 304 of members of the set of graphical function icons 302. For example, if the definitions 304 provided for a standard "AND" function with two inputs, the user 101 could change the definitions 304 such that the standard "AND" function would have three inputs.

In a further embodiment, the expression function definition file 303 is extensible where the user 101 can add new graphical function icons to the set of graphical function icons 302. For example, if the user 101 desired a "bitwise OR" function, and there was no standard "bitwise OR" function, the user could add an appropriate image to the set of graphical function icons 302, then insert and associate an appropriate definition 304, and the new graphical expression function icon 206 would then be available for selection by the user 101.

The method 800 may continue with the expression icon module 204 displaying 806 at least one graphical expression function icon 206 to the user 101, and with the business attribute module 208 displaying 808 at least one graphical business attribute icon 210 to the user 101. The method 800 may continue with the user interface module 212 displaying 810 a staging canvas 214 having a result icon 216. The user interface module 212 may position 812 at least one graphical expression function icon 206 and position 814 at least one graphical business attribute icon 210 on the staging canvas 214 in response to input from a user 101. The user interface module 212 may then define 816 a graphical business rule condition 222 by graphically relating the at least one positioned graphical expression function icon 206, the at least one positioned graphical business attribute icon 210, and the result icon 216 in response to input from the user 101.

The method 800 may continue with the expression validation module 402 validating 818 the graphical business rule condition 222 to detect semantic errors. If the graphical business rule condition 222 is not valid, the expression validation module 402 may prompt 824 the user 101 to revise the graphical business rule condition 222 and return to displaying 810 the staging canvas 214. If the graphical business rule condition 222 is valid, the method 800 may proceed with the expression definition module 220 translating 820 the graphical business rule condition 222 into a logical expression 224. Then, the source code module 226 may convert 822 the logical expression to source code 228 having a syntax compatible with a target source code language.

Figure 9:
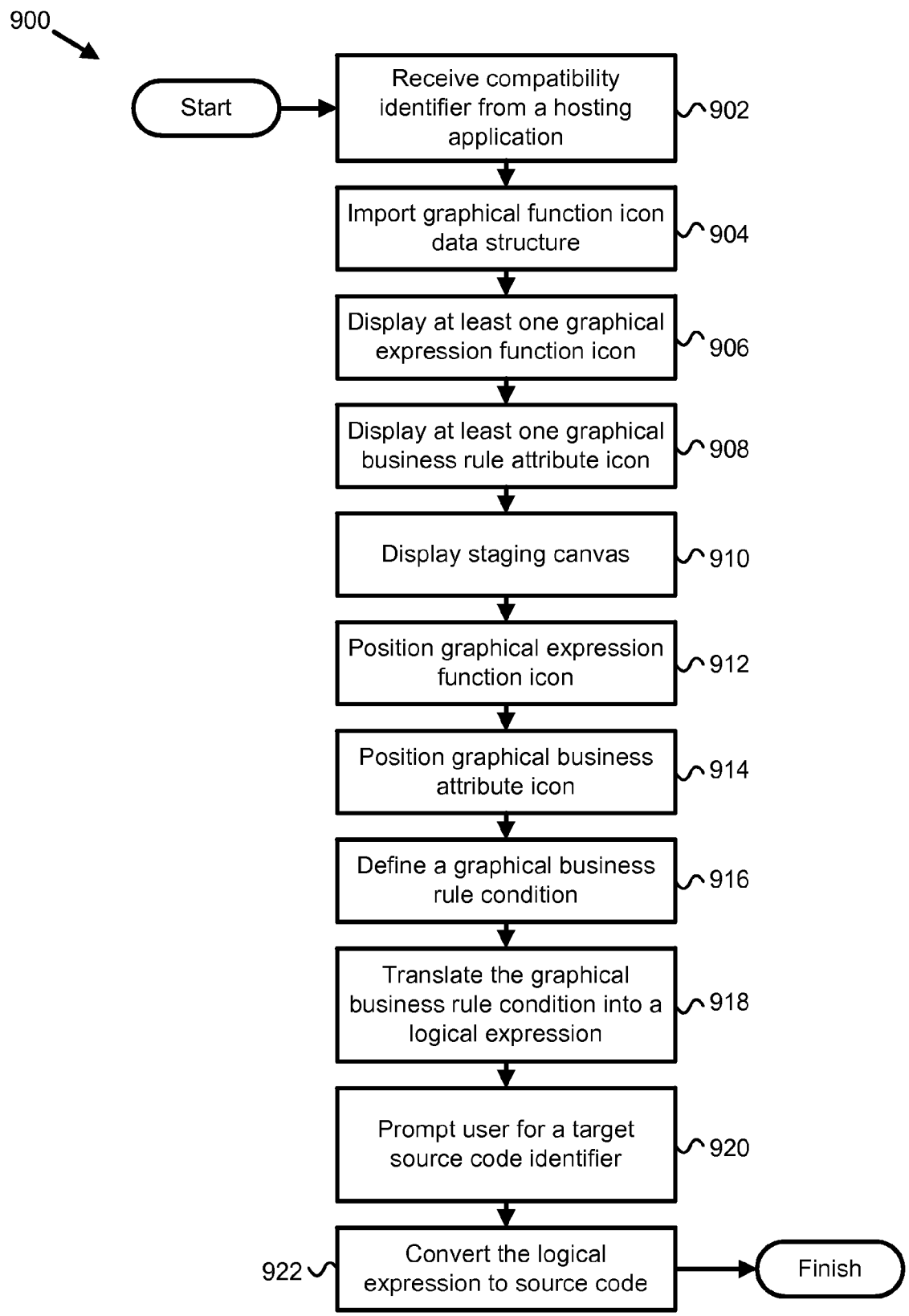
FIG. 9 is a schematic flow chart diagram illustrating an alternative embodiment of a method for graphically building business rule conditions in accordance with the present invention.

FIG. 9 illustrates one embodiment of a method 900 to graphically build business rule conditions in accordance with the present invention. The expression icon module 204 receives 902 a compatibility identifier from a hosting application comprising a development environment 105, and imports 904 a graphical function expression icon data structure 230 based on the compatibility identifier. For example, the hosting application may not support bitwise operations, and a compatibility identifier from such hosting applications may point to a data structure 230 wherein the expression function definition file 303 does not contain any graphical function icons 302 or definitions 304 with bitwise operations.

The method 900 may continue with the expression icon module 204 displaying 906 at least one graphical expression function icon 206 to the user 101, and with the business attribute module 208 displaying 908 at least one graphical business attribute icon 210 to the user 101. The method 900 may continue with the user interface module 212 displaying 910 a staging canvas 214 having a result icon 216. The user interface module 212 may position 912 at least one graphical expression function icon 206 and position 914 at least one graphical business attribute icon 210 on the staging canvas 214 in response to input from a user 101. The user interface module 212 may then define 916 a graphical business rule condition 222 by graphically relating the at least one positioned graphical expression function icon 206, the at least one positioned graphical business attribute icon 210, and the result icon 216 in response to input from the user 101.

The method 900 may continue with the expression definition module 220 translating 918 the graphical business rule condition 222 into a logical expression 224. Then, the source code module 226 may prompt 920 a user 101 for a target source code identifier 225 that identifies the target source code language, and convert 922 the logical expression 224 to source code 228 having a syntax compatible with a target source code language.

Figure 10:
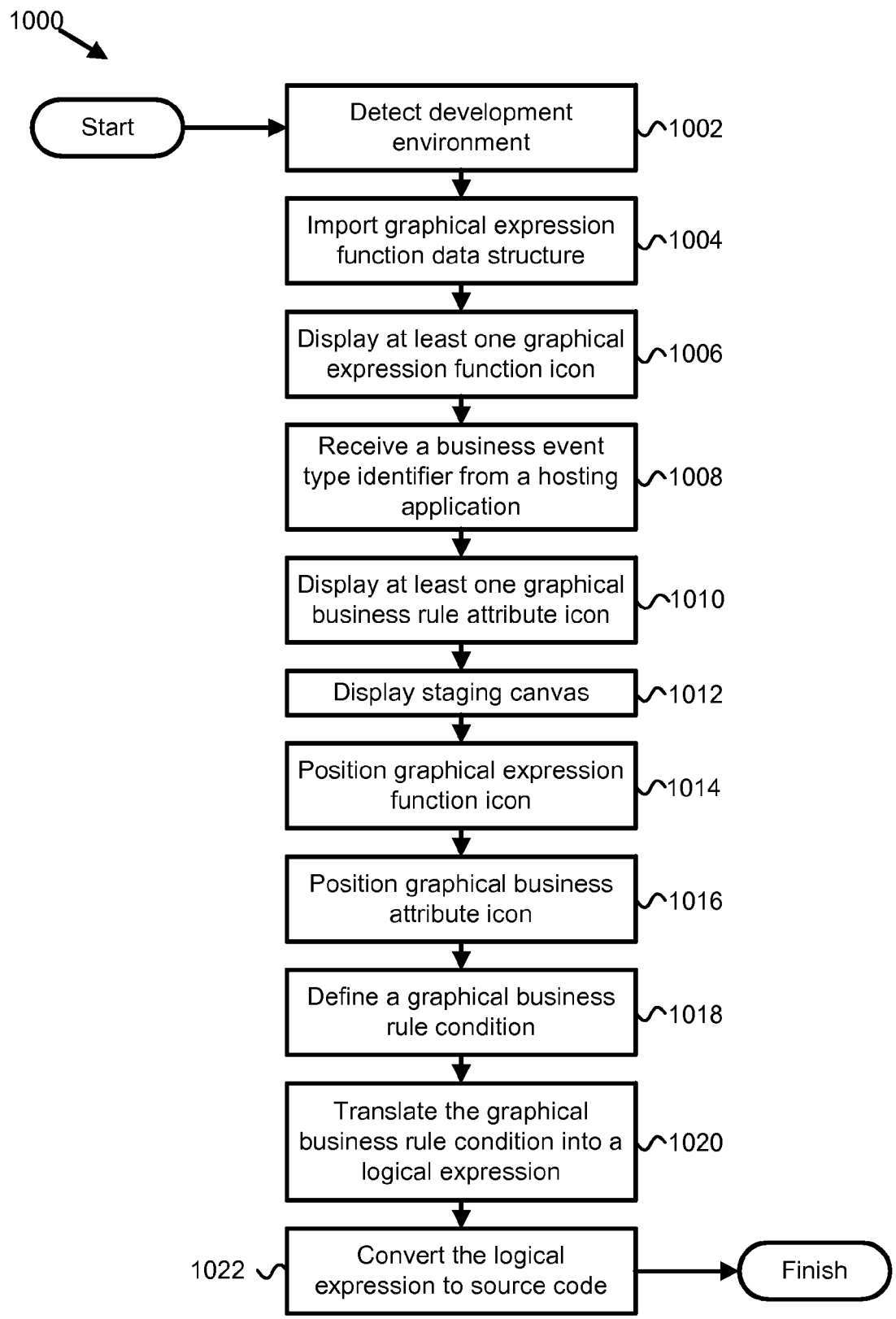
FIG. 10 is a schematic flow chart diagram illustrating an alternative embodiment of a method for graphically building business rule conditions in accordance with the present invention.

FIG. 10 illustrates one embodiment of a method 1000 to graphically build business rule conditions in accordance with the present invention. The expression icon module 204 detects 1002 a development environment 105, and imports 1004 a graphical function expression icon data structure 230 based on the development environment 105. For example, the development environment 105 may not support exponential math operations, and a expression icon module 204 may be configured to import an appropriate data structure 230 in that case such the expression function definition file 303 does not contain any graphical function icons 302 or definitions 304 with exponential math operations.

The method 1000 may continue with the expression icon module 204 displaying 1006 at least one graphical expression function icon 206 to the user 101. The method 1000 may continue with the business attribute module 208 receiving 1008 a business event type identifier 232 from a hosting application comprising a development environment 105, and retrieving a set of business attributes from the business object definition file 234 based on the business event type identifier 232. The method 1000 may proceed with the business attribute module 208 displaying 1010 at least one graphical business attribute icon 210 based on the set of business attributes from the business object definition file 234.

The method 1000 may continue with the user interface module 212 displaying 1010 a staging canvas 214 having a result icon 216. The user interface module 212 may position 1012 at least one graphical expression function icon 206 and position 1014 at least one graphical business rule icon 210 on the staging canvas 214 in response to input from a user 101. The user interface module 212 may then define 1016 a graphical business rule condition by graphically relating the at least one positioned graphical expression function icon 206, the at least one positioned graphical business attribute icon 210, and the result icon 216 in response to input from the user 101.

The method 1000 may continue with the expression definition module 220 translating 1018 the graphical business rule condition 222 into a logical expression 224. Then, the source code module 226 may convert 1020 the logical expression to source code 228 having a syntax compatible with a target source code language.

Figure 11:
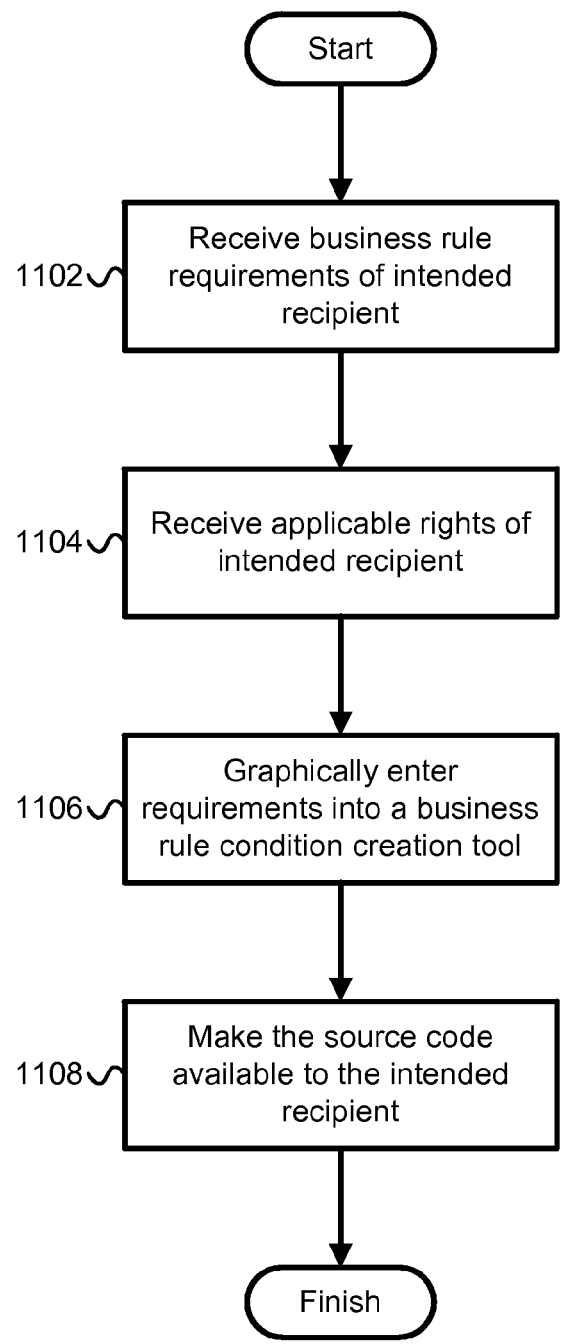
FIG. 11 is a schematic flow chart diagram illustrating one embodiment of a method for drafting business rule conditions in accordance with the present invention.

FIG. 11 depicts one embodiment of a method 1100 to draft business rule conditions. The method 1100 may begin with receiving 1102 the business rule requirements of an intended recipient. For example, the recipient may be a customer that calls to request that a business rule be added to their ordering website so they can send a satisfaction survey to every third person that orders a new product. The method 1100 may continue with receiving 1104 the applicable rights of the intended recipient. For example, in a human resources application, there may be advanced graphical function icons 206 available only to intended recipients at the Vice-President or higher level, and those features could be enabled or disabled according to the applicable rights of the intended recipient.

The method 1100 may continue with a user 101 graphically entering 1106 the requirements of the intended recipient into a business rule condition creation tool 114. The method 1100 may proceed with making 1108 the source code 228 available to the intended recipient. Making 1108 the source code available to the intended recipient may comprise providing the intended recipient with a printout of the source code 228, providing the intended recipient with an electronic copy of the source code 228, or installing the source code 228 on a system used by the intended recipient such that the effect of the source code 228 is available to the intended recipient.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a computer storage device having computer usable program code programmed to generate source code that defines a business rule condition, the operations of the computer program product comprising:

displaying a business rule condition creation tool comprising at least one graphical expression function icon, at least one graphical business attribute icon, and a staging canvas having a result icon, the tool configured to operate within a build-time development environment and wherein the at least one graphical expression function icon comprises a description and an iconic symbol configured to convey the purpose of an associated atomic operator to a non-technical user without knowledge of business rule condition programming;

positioning the at least one graphical expression function icon on the staging canvas;

positioning the at least one graphical business attribute icon on the staging canvas;

defining a graphical business rule condition by graphically relating the at least one positioned graphical expression function icon, the at least one positioned graphical business attribute icon, and the result icon in response to input from a user;

translating the graphical business rule condition into a logical expression; and converting the logical expression to source code having a syntax compatible with a target source code language, the source code configured to operate as part of a business rule processing module in a run-time environment, the run-time environment configured to operate simultaneous to the operation of the build-time development environment and configured to operate with a previous version of the business rule processing module.

2. The computer program product of claim 1, wherein the at least one graphical expression function icon includes at least one input connector icon and at least one output connector icon, the at least one graphical business attribute icon comprises at least one output connector icon, the result icon includes at least one input connector icon, and wherein relating the at least one graphical expression function icon, the at least one graphical business attribute icon, and the result icon comprises graphically connecting an output connector icon to an input connector icon in response to a drag and drop command that designates the output connector icon and the input connector icon.

3. The computer program product of claim 1, further comprising retrieving an expression function definition file, the definition file comprising a customizable and extensible set of characteristics for each graphical expression function icon.

4. The computer program product of claim 3, wherein retrieving the expression function definition file comprises retrieving the expression function definition file based on applicable rights of the user.

5. The computer program product of claim 1, further comprising prompting the user for a target source code identifier that identifies the target source code language.

6. The computer program product of claim 1, further comprising receiving a compatibility identifier from a hosting application, and retrieving an expression function definition file based on the compatibility identifier, the definition file comprising a set of expression functions and a set of characteristics for each of the expression functions, and wherein the at least one graphical function icon is based on a member of the set of expression functions.

7. The computer program product of claim 1, further comprising importing a data structure that comprises graphical function icons supported within a development environment, logical definitions for the graphical function icons, and source code syntax for each of the graphical function icons, the syntax specific to the development environment.

8. The computer program product of claim 1, further comprising receiving a business event type identifier from a hosting application, retrieving a set of business attributes from a business object definition file based on the business event type identifier, and wherein the at least one graphical business attribute icon is based on a member of the set of business attributes.

9. The computer program product of claim 8, wherein each business attribute from the set of business attributes comprises one of a business event identifier, a business event subject identifier, and a business event subject property value.

10. The computer program product of claim 1, wherein the at least one graphical expression function icon is associated with an atomic operator configured to operate on at least one operand and return a result without additional configuration input from a user.

11. The computer program product of claim 1, wherein the result icon represents a Boolean result value for the graphical business rule condition.

12. An apparatus for drafting business rule conditions, the apparatus comprising:
a processor;
a development environment comprising a business event input connection, a result output connection, and a business event screening utility configured to conditionally execute a business rule;
a business rule condition creation tool configured to operate within the development environment for creating a business rule during build-time for use by a business rule processing module, the tool having a graphical condition builder comprising:
an expression icon module configured to display a graphical expression function icon to a user, wherein the icon conveys the expression function for the graphical expression function icon to a non-technical user without knowledge of business rule programming;
a business attribute module configured to display a graphical business attribute icon to a user;
a user interface module configured to display a staging canvas having a result icon, and configured to accept drag-and-drop user commands: to position the graphical expression function icon on the staging canvas;
to position the graphical business attribute icon on the staging canvas; and
to define a graphical representation of a condition within a business rule by relating the graphical expression function, the graphical business attribute icon, and the result icon;
an expression definition module configured to translate the condition into a logical expression; and
a source code module configured to convert the logical expression to a condition comprising source code having a syntax compatible with a target source code language, the source code configured to operate as part of the business rule processing module in a run-time environment, the run-time environment configured to operate simultaneous to the operation of the build-time development environment and configured to operate with a previous version of the business rule processing module.

13. The apparatus of claim 12, wherein the business rule condition creation tool further comprises an expression validation module configured to validate the graphical representation of a condition.

14. The apparatus of claim 12, wherein the expression icon module is further configured to import a data structure from the development environment, the data structure comprising a set of graphical function icons supported within the development environment, logical definitions for the set of graphical function icons, and source code syntax for each of the graphical function icons, the syntax specific to the development environment.

15. The apparatus of claim 12, wherein the at least one graphical expression function icon comprises a description and an iconic symbol configured to convey the purpose of an associated atomic operator to a non-technical user without knowledge of business rule condition programming.

16. The apparatus of claim 12, wherein the business attribute module is further configured to receive a business event type identifier from the development environment, to retrieve a set of business attributes from a business object definition file based on the business event type identifier, and wherein the graphical business attribute icon is based on a member of the set of business attributes.

17. The apparatus of claim 12, wherein the business rule condition creation tool further comprises a reviewing module configured to allow a user to pictorially review and revise the graphical representation of a condition and make graphical modifications.

18. The apparatus of claim 12, wherein the business rule condition creation tool is a plug-in to the development environment.

19. A system for drafting business rule conditions, the system comprising:
a processor;
a memory coupled to the processor, the memory comprising,
a development environment comprising a business event input connection,
a result output connection, and a business event screening utility configured to conditionally execute a business rule; and
a business rule condition creation tool stored on a memory device,
configured to operate within the development environment for creating a business rule during build-time for use by a business rule processing module, the tool having a graphical condition builder comprising:
an expression icon module configured to display a graphical expression function icon to a user, wherein the icon conveys the expression function for the graphical expression function icon to a non-technical user without knowledge of business rule programming;
a business attribute module configured to display a graphical business attribute icon to a user;
a user interface module configured to display a staging canvas having a result icon, and configured to accept drag-and-drop user commands: to position the graphical expression function icon on the staging canvas;
to position the graphical business attribute icon on the staging canvas; and
to define a graphical representation of a condition within a business rule by relating the graphical expression function, the graphical business attribute icon, and the result icon;

an expression definition module configured to translate the condition into a logical expression; and a source code module configured to convert the logical expression to a condition comprising source code having a syntax compatible with a target source code language; and a run-time integration server coupled to a network, the integration server configured to receive a business object probe from an enterprise information system over the network, and to send the business object probe to a previous version of the business rule processing module configured to execute the business rule on the received business object probe simultaneous to the processing of the development environment.

20. The system of claim 19, wherein the business rule condition creation tool further comprises an expression validation module configured to validate the graphical representation of a condition.

* * * * *